Figure 1:
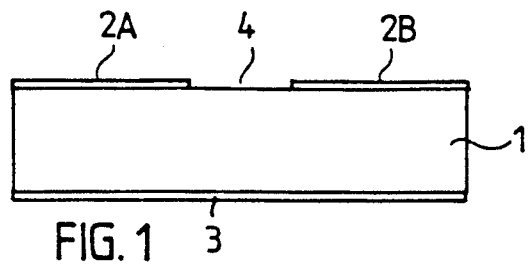

United States Patent [19]

Honkanen et al.

[11] Patent Number: 5,035,734
[45] Date of Patent: Jul. 30, 1991

[54] METHOD OF PRODUCING OPTICAL WAVEGUIDES

[75] Inventors: Seppo Honkanen; Simo Tammela; Ari Tervonen, all of Espoo, Finland

[73] Assignee: Oy Nokia Ab

[21] Appl. No.: 507,781

[22] Filed: Apr. 12, 1990

[30] Foreign Application Priority Data

Apr. 13, 1989 [FI] Finland ................. 891767

[51] Int. Cl.⁵ ............................................. C03C 21/00
[52] U.S. Cl. ................................. 65/30.13; 65/3.14; 65/31
[58] Field of Search ............. 65/3.14, 30.13, 31

[56] References Cited

U.S. PATENT DOCUMENTS

| 3,880,630 | 4/1975 | Izawa | 65/3.14 X |
| 4,711,514 | 12/1987 | Tangonan et al. | 65/30.13 X |
| 4,842,629 | 6/1989 | Clemens et al. | 65/30.13 |

FOREIGN PATENT DOCUMENTS

| 58-118610 | 7/1983 | Japan | 65/3.14 |
| 60-66210 | 4/1985 | Japan | 65/3.14 |

Primary Examiner—Robert L. Lindsay
Attorney, Agent, or Firm—Finnegan, Henderson, Farabow, Garrett & Dunner

[57] ABSTRACT

The invention relates to a method of producing optical waveguides by ion exchange technique in a glass substrate (1), the ion exchange between a source of ions (such as AgNO₃) and the glass substrate (1) taking place within glass substrate surface areas (6) which do not comprise any ion exchange mask. In the method of the invention, the ion exchange mask is formed by depletion areas (5A, 5B) formed in the surface of the glass substrate.

7 Claims, 1 Drawing Sheet

METHOD OF PRODUCING OPTICAL WAVEGUIDES

The invention relates to a method of producing optical waveguides by ion-exchange technique in a glass substrate, wherein the ion-exchange between a source of ions and the surface of the glass substrate takes place within glass substrate surface areas having no ion-exchange mask.

Optical waveguides produced by ion-exchange technique in a glass substrate are promising for use in optical signal processing applications in optical communications, sensors, and other related areas.

In ion-exchange optical waveguides are formed in a glass substrate when the refractive index of the glass substrate is modified (increased) locally by exchanging ions originally present in glass (such as sodium or $Na^+$ ions) by diffusion with other ions from an external source of ions, such as $Cs^+$, $Rb^+$, $Li^+$, $K^+$, $Ag^+$ or $Tl^+$. The source of ions generally consists of a molten salt solution or a silver film deposited on the surface of the glass. For the principles of the ion-exchange technique, the following article is referred to:

[1] *Ion-Exchanged Glass Waveguides: A Review*, R. V. Ramaswamy, Journal of Lightwave Technology, Vol. 6, No. 6, June 1988.

Traditionally, a metal film acting as a mask layer is deposited on the surface of the glass substrate. Openings or windows corresponding to the optical waveguides are then patterned in the metal film by lithography technique. Ions are diffused through the openings or windows into the glass at elevated temperature. As a result of the ion exchange the refractive index of the glass substrate is increased at the mask openings, so that optical waveguides or channels are formed in the glass.

When the source of ions consists of molten salt, it is today customary to use two-layer masks (e.g. $Al/Al_2O_3$) as film masks to prevent the formation of pin holes, that is, spotlike corrosions penetrating through the mask. In general, molten salt solutions, however, corrode all metal masks to such an extent that deep optical channels requiring long diffusion times are difficult to produce. Examples of the use of masks in connection with molten salt solutions can be found in the articles:

[2] *Index Profiles of Multimode Optical Strip Waveguides be Field-Enhanced Ion Exchange in Glasses*, H. J. Lilienhof, Optics Communications, Volume 35, No. 1, October 1980.

[3] *Planar Gradient-Index Glass Waveguide and its Applications to a 4-Port Branched Circuit and Star Coupler*, Eiji Okuda, Applied Optics, Vol. 23, No. 11, June 1984.

Thin films of silver can be used in place of molten salt sources. The silver film (Ag) is evaporated on the surface of a glass substrate, so that the ion-exchange takes place under the influence of an electric field connected between the silver film and a cathode film positioned on the other side of the substrate. To produce optical channels, the anode side (facing the silver film) has to be patterned. The pattern can be formed directly in the silver film. A technique slightly easier to carry out is to use a patterned aluminium mask film between the glass and the silver film because the lithography technique is more applicable to aluminium. The lithography steps can be avoided by using commercial Cr mask glasses comprising a mask film of chrome on a high-quality glass substrate. The manufacturer patterns the chrome films by a lithography technique used in the production of integrated circuits with a very high precision and reliability. These chrome masks cannot be used with molten salt solutions because these corrode chrome. Examples of the use of masks with silver films can be found in the articles:

[4] *Ion Exchange Process for Fabrication of Waveguide Couplers for Fiber Optic Sensor Applications*, S. Honkanen, Journal of Applied Physics 61, p. 52–56, January 1987.

[5] *Ion Exchange Processes in Glass for Fabrication of Waveguide Couplers*, A. Tervonen, SPIE, Vol. 862-Optical Interconnections (1987), p. 32–39.

As the silver film is intended to touch the glass substrate through the openings in the mask film, a step or and edge in the mask disturbs the control of the ion exchange when forming deep optical channels and using thick silver films. Reference [5] discloses a method in which potassium-containing zones formed in the surface of the glass are used in place of a metal film, thus obtaining an even surface on which the silver film is formed. A problem with this method is that even though the potassium ions within the mask zones have a low mobility at the process temperature (about 200° C.), part of them are nevertheless replaced by silver ions, which alters the refractive index also within the mask areas. For this reason, the potassium-containing zones do not act sufficiently efficiently as a mask when deep optical channels requiring long diffusion times are produced. In addition, this may cause crosstalk between the different channels in certain applications.

The object of the invention is to provide a new method of producing optical waveguides, which avoids the above-described problems.

This is achieved by means of a method of the type described in the preamble, which is characterized in that the ion exchange mask is formed by depletion areas formed in the surface of the glass substrate.

The basic idea of the invention is that an electric field is connected at elevated temperature between a metal film mask (anode) formed on one side of the glass substrate and a metal film (cathode) formed on the opposite side. Positive ions (such as sodium ions) under the metal film then move away from the vicinity of the surface and form so-called depletion areas. As used herein, the term depletion area refers to glass substrate areas comprising little if any sodium ions. When the metal mask is removed, an depletion area pattern is left on the glass substrate. This pattern is a "copy" of the mask pattern. A conventional ion exchange process is then carried out by using a silver film or a molten salt solution as a source of ions. The ion exchange takes place only within areas between the depletion areas (at the openings of the original metal mask).

The advantages of the invention include the following:

Pin holes contained in the original metal mask are blocked within the depletion area, which is of great importance in long ion exchange processes utilizing an electric field, As distinct from a metal mask, the depletion area mask will not wear nor corrode by molten salt solutions, not even in long processes, The depletion area mask can penetrate relatively deep into the glass substrate, thus restricting sideward ion exchange in the direction of the surface of the substrate. This enables the production of highly symmetrical uniform optical waveguides. In addition, it is possible to provide optical channels even narrower than the openings of the original metal mask, which reduces the standard required from applied lithography.

The invention enables direct use of commercial Cr mask glasses as substrates with molten salt solutions, A completely planar surface is obtained which facilitates long ion exchanges from thick silver films. If the ion exchange is carried out in a vacuum during the evaporation of the silver film, the silver films adhere better to the glass than when using a mask patterned in the surface.

The invention will now be described in greater detail by means of embodiments and with reference to the drawing, in which the FIGS. 1 to 5 illustrate the different operational steps of the method of the invention. In the method of the invention, a thin film 2 of metal is deposited, e.g. by sputtering, on one planar surface of a preferably sheet-like glass substrate 1. Openings 4 are patterned in the metal film by lithography technique, as shown in FIG. 1. The thin-film mask used in the invention forms a so-called positive mask pattern in which the openings 4 correspond to the desired optical waveguides and the thin-film areas 2 correspond to areas in which no ion exchange and resulting formation of optical waveguides should take place.

Alternatively, it is also possible to use such commercial mask plates as described in the above reference [5], that is, a thin film of chrome deposited on a glass substrate.

Figure 2:
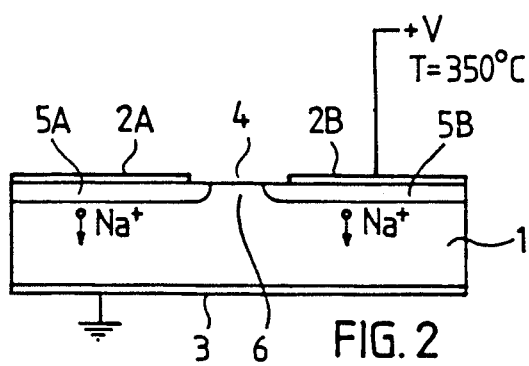

In the second operational step of the method, the temperature of the glass substrate 1 is raised (e.g. 350° C.) and an electric field is deposited between the mask film 2A, 2B and a metal film 3 formed on the opposite side of the glass substrate 1 by connecting the more positive terminal of the source of voltage to the mask film 2A, 2B and the more negative terminal to the metal film 3. Under the influence of the electric field, sodium or Na+ ions in the surface of the glass substrate 1 under the mask films 2A, 2B move toward the metal film 3 (cathode) away from the vicinity of the surface. As shown in FIG. 2, so-called depletion areas 5A and 5B containing little if any sodium ions are formed below the mask films 2A, 2B (anode), penetrating into a predetermined depth in the glass substrate 1. At the openings 4 of the mask film, no depletion of sodium ions occurs, so the amount of sodium ions is normal within areas 6 remaining at the openings 4 in the surface of the substrate 1.

Figure 3A:
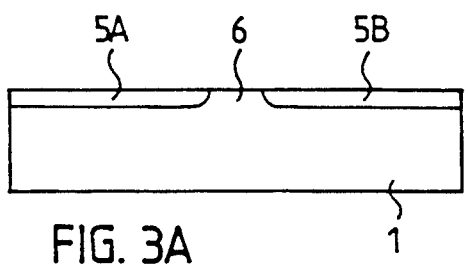
Figure 3B:
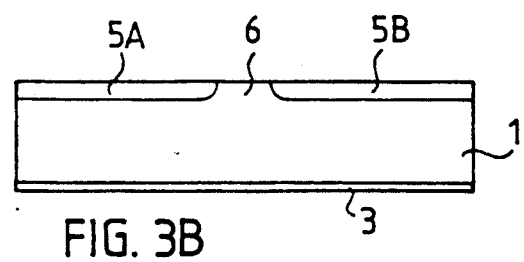

Subsequently, the metal films 2A, 2B and 3 are removed as shown in FIG. 3A, whereby the depletion areas 5A and 5B formed as described above remain permanently in the surface of the glass substrate 1, forming a "copy" of the original mask pattern, in which the depletion areas correspond to areas previously covered with the metal mask.

The area 6 between the formed depletion areas 5A and 5B is preferably constricted slightly narrower than the original opening 4 in the metal film 2. This lowers the standard required from the lithography technique.

The glass substrate masked according to the invention with depletion areas can now be used as such in connection with conventional ion exchange techniques.

Figure 4A:
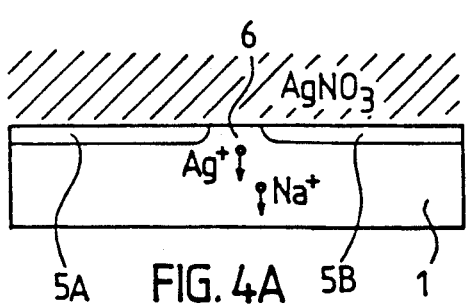
Figure 4B:
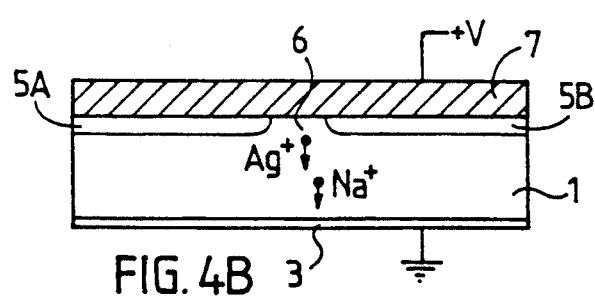
Figure 5:
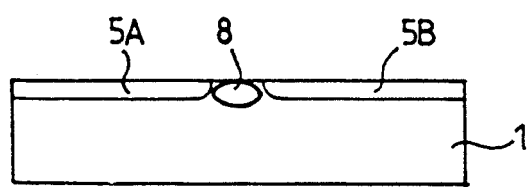

In FIG. 4A, for example, a molten salt solution, such as $AgNO_3$, acting as a source of ions is allowed to influence the masked surface of the glass substrate 1 at elevated temperature (e.g. 250° C.). In practice, the glass substrate is immersed in the salt solution. Ion exchange between the salt solution $AgNO_3$ and the glass takes place only within the unmasked areas 6 containing sodium ions but not within the masked depletion areas 5A and 5B because they do not contain any sodium ions which could be replaced with $Ag^+$ ion. When the ion exchange continues for a sufficiently long period of time, a great amount of $Ag^+$ ions is gathered within the area 6. The $Ag^+$ ions increase the glass refractive index within this particular area, forming an optical guide 6, 8, as shown in FIG. 5. Other widely used molten salt solutions ions include $KNO_3$, $CsNO_3$, $TlNO_3$ and $NaNO_3$.

Lateral ion exchange is not possible between the area 6 and the depletion areas 5A and 5B, which enables the production of more symmetrical uniform optical waveguides.

Alternatively, the original mask film can be removed after the formation of the depletion areas 5A and 5B, and a silver film 7 acting as a source of ions can be formed directly on the surface of the glass substrate. An electric field is connected at elevated temperature between the silver film 7 and a metal film 3 provided on the opposite side of the substrate 1. The ion exchange then takes place only within the previously unmasked areas 6 similarly as described in connection with FIG. 4A. As a result, an optical waveguide of FIG. 5 is obtained.

The figures and the description related to them are only intended to illustrate the invention. In its details, the method of the invention may vary within the scope of the attached claims.

We claim:

1. A method of producing optical waveguides by ion exchange technique in a glass substrate, comprising conducting an ion exchange between a source of ions and a surface of the glass substrate within at least one glass substrate surface area having no ion exchange mask, while employing an ion exchange mask formed by ion-depleted areas formed in the surface of a glass substrate as a result of moving ions in the glass of said substrate away from the vicinity of the surface thereof.

2. A method according to claim 1, wherein the depletion areas are formed by
   depositing a first metal film on the surface of the glass substrate;
   removing the first metal film from areas in which the optical waveguides are to be formed;
   depositing a second metal film on an opposite side of the glass substrate;
   connecting an electric field between the first and the second metal film so that ions in the surface of the glass substrate under the first metal film move away from the vicinity of the surface, a depletion area being formed in the surface; and
   removing said metal films.

3. A method according to claim 1 or 2, wherein the ions are sodium ions.

4. A method according to claim 1 or 2, wherein the source of ions consists of a molten salt solution.

5. A method according to claim 1 or 2, wherein the source of ions consists of a silver film formed directly on the surface of the glass substrate.

6. A method of producing an optical waveguide by ion exchange in a glass substrate, which method comprises:

(a) moving ions in the glass of said substrate away from the vicinity of a surface of said substrate in at least a first area thereof to form an ion-depleted area in said surface;
(b) maintaining at least a second area of said substrate surface wherein ion depletion does not occur; and
(c) effecting ion exchange between a source of ions and said second area of said substrate, while employing said ion-depleted area of said substrate as an ion-exchange mask to prevent said ion-exchange from occurring in said first area.

7. The method of claim 6, wherein the ions in the glass of said substrate are moved away from surface under the influence of an electric field.

* * * * *

UNITED STATES PATENT AND TRADEMARK OFFICE
CERTIFICATE OF CORRECTION

PATENT NO. : 5,035,734
DATED : July 30, 1991
INVENTOR(S) : Seppo Honkanen; Simo Tammela et al.

It is certified that error appears in the above-identified patent and that said Letters Patent is hereby corrected as shown below:

On Title Page: Assignee, change "Oy Nokia Ab" to --Oy Nokia Ab, Helsinki, Finland--.

Abstract, line 9, after "strate." insert --(Fig. 4)--.

Column 3, line 17, delete the paragraph and run-in with line 16.

Signed and Sealed this

Tenth Day of November, 1992

*Attest:*

DOUGLAS B. COMER

*Attesting Officer*   *Acting Commissioner of Patents and Trademarks*